United States Patent
Woo et al.

(10) Patent No.: US 8,094,936 B2
(45) Date of Patent: Jan. 10, 2012

(54) METHOD AND APPARATUS TO SEGMENT MOTION AREA IN REAL-TIME TO DETECT MOTION IN SURVEILLANCE CAMERA SYSTEM

(75) Inventors: Hyen-kyun Woo, Seoul (KR); Jin-keun Seo, Seoul (KR); Min-ok Lee, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 1086 days.

(21) Appl. No.: 11/942,089

(22) Filed: Nov. 19, 2007

(65) Prior Publication Data

US 2008/0292142 A1 Nov. 27, 2008

(30) Foreign Application Priority Data

May 23, 2007 (KR) .................. 10-2007-0050434

(51) Int. Cl.
*G06K 9/00* (2006.01)
*G06K 9/34* (2006.01)
(52) U.S. Cl. ................... 382/173; 382/103; 382/107
(58) Field of Classification Search ............... None
See application file for complete search history.

(56) References Cited

U.S. PATENT DOCUMENTS

| 7,418,134 B2 * | 8/2008 | Schwartz et al. ............ 382/173 |
| 2005/0041102 A1 | 2/2005 | Bongiovanni et al. | |
| 2007/0122039 A1 * | 5/2007 | Zhang et al. ................. 382/199 |
| 2008/0069415 A1 * | 3/2008 | Schildkraut et al. .......... 382/128 |
| 2008/0205721 A1 * | 8/2008 | Udupa et al. ................. 382/128 |

OTHER PUBLICATIONS

Chan et al. "Active contours without edges", IEEE Trans. on Image Processing, 10(2), 266-277, 2001.*
Suk-Ho Lee et al., "Level set-based bimodal segmentation with stationary global minimum", IEEE Transactions on Image Processing, vol. 15, No. 9, Sep. 2006, pp. 2843-2852.
Alan McIvor, "Background Subtraction Techniques", Proc. of Image and Vision Computing, 200, pp. 1-6, New Zealand.
Nikos Paragios et al., "Geodesic active regions and level set methods for motion estimation and tracking", Computer Vision and Image Understandings, vol. 97, No. 3, Mar. 1, 2005, pp. 259-282, USA.
Lin Lui et al., "Human Contour Extraction Using Level Set", Computer and Information Technology, The Fifth International Conference on Shanghai, China, Sep. 21, 2005, pp. 608-613, USA.

(Continued)

*Primary Examiner* — Samir Ahmed
*Assistant Examiner* — Li Liu
(74) *Attorney, Agent, or Firm* — Sughrue Mion, PLLC (57) ABSTRACT

A method and apparatus to segment a motion area in real-time to detect motion in a surveillance camera system are provided. The method includes updating a background image by using a previous input image from among an input image sequence, generating a difference image between a current image of the image sequence and the background image, generating a second function to minimize a first function including regularized energy in the motion area of the difference image and regularized energy in an area without motion of the difference image and segmenting the motion area based on the second function. Therefore, while noise is removed, the motion area is segmented accurately and rapidly even in a low illumination environment so as to detect a moving object.

21 Claims, 5 Drawing Sheets

OTHER PUBLICATIONS

Myo Thida et al., "An Improved Real-Time Contour Tracking Algorithm Using Fast Level Set Method", Advances in Image and Video Technology Lecture Notes in Computer Science, vol. 4319, Jan. 1, 2006, pp. 702-711.

Hyenkyun Woo et al., "Real-time motion detection in video surveillance using a level set-based energy functional", KSIAM Conference, May 26, 2007, pp. 1-5.

* cited by examiner

METHOD AND APPARATUS TO SEGMENT MOTION AREA IN REAL-TIME TO DETECT MOTION IN SURVEILLANCE CAMERA SYSTEM

CROSS-REFERENCE TO RELATED APPLICATIONS

This application claims priority under 35 U.S.C. §119(a) from Korean Patent Application No. 10-2007-0050434, filed on May 23, 2007, in the Korean Intellectual Property Office, the disclosure of which is incorporated herein in its entirety by reference.

BACKGROUND OF THE INVENTION

1. Field of the Invention

The present general inventive concept relates to a method and apparatus to segment a motion area in real-time to detect motion in a surveillance camera system, and more particularly, to a method and apparatus to segment a motion area to detect motion while simultaneously performing a noise removal and a motion area segmentation even in a low illumination environment.

2. Description of the Related Art

Surveillance systems in which closed-circuit television (CCTV) cameras are used are continually being developed. In a surveillance system, an image sequence is transmitted to a surveillance center and displayed on various video monitor screens. Security guards observe hundreds of video channels displayed on monitor screens. An artificially intelligent video surveillance system applies a motion detection algorithm which determines the area in which an object is in motion in a given image, thereby making it easier for the security guards to pinpoint moving objects. As a result, the security guards only focus on the monitor in which motion of the object is detected.

Even if there is no motion, the surveillance system needs to record large amounts of video data. A video compression algorithm is used to store the large amounts of video data when a storage capacity is limited due to the large amounts of data generated in the video surveillance system. However, in a dark environment, the compression efficiency of the video compression algorithm is decreased due to noise of an image sensor. In order to overcome this problem, a motion detection algorithm is used particularly at night. The motion detection algorithm determines whether an object is in motion in an image and if no motion is determined, the image is not recorded. Accordingly, motion is detected with an efficient technology and it is more efficient at night where less motion is generated.

In a conventional surveillance system, most motion detection is performed by using a modification of a thresholding method such as a mixture of Gaussian, Pfinder, and $W^4$. In these technologies, an area segmentation of moving objects is performed in pixel units based on an image threshold of a difference between a background image and a current image and a morphological filter as a post-process. This technology can be performed satisfactorily during the daytime; however, false positives and aural warnings may be generated at night due to noise in an image sequence.

SUMMARY OF THE INVENTION

The present general inventive concept provides a method and apparatus to segment a motion area to detect motion in a surveillance system, and more particularly, to a method and apparatus to segment a motion area to accurately detect a motion even in a low illumination environment while simultaneously removing noise and segmenting a motion area.

In addition, the present general inventive concept provides a method of detecting motion in which sudden light changes are considered.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of segmenting a motion area, the method including updating a background image by using a previous input image from an input image sequence, generating a difference image between a current image of the image sequence and the background image, generating a second function to minimize a first function including regularized energy in the motion area of the difference image and regularized energy in an area without motion of the difference image and segmenting the motion area based on the second function.

The regularized energy in a motion area of the difference image may use the difference between a first standard value that is based on an average value of the motion area and the difference image and the regularized energy in an area without motion of the difference image may use the difference between a second standard value that is based on an average value of the area without motion and the difference image.

Each one of the regularized energies of the motion area and the area without motion may be the energy of the motion area and the energy of the area without motion are respectively divided by a sum of the energy of the motion area and the energy of the area without motion.

The updating a background image may include adding the result obtained by multiplying the previous input image by a first weight to a result obtained by multiplying the previous input image by a second weight, wherein a sum of the first weight and the second weight is 1.

The segmenting a motion area may include determining a pixel of the difference image in which a second function value is greater than 0 as a pixel of the motion area, determining a pixel of the difference image in which a second function value is less than 0 as a pixel of the area without motion, determining a pixel of the difference image in which a second function value is 0 as a pixel of a boundary of the motion area and when a number of pixels in which the second function value is greater than 0 is above a predetermined threshold, determining that motion is detected in the current image.

The first function may include noise energy using a function related to a partial differential value of the second function.

The generating the second function may include adjusting a frequency of iteration by adjusting a converged value of the second function after a range of the second function is limited and obtaining the second function by iteration.

The second function may be obtained in real-time by using a previous second function, a partial differential equation of the difference image, energy in which energy of a motion image is regularized based on the second function, and a function in which energy of an image without motion is regularized based on the second function, by the iteration.

Each one of the regularized energies of the motion area and the area without motion may be the energy of the motion area and the energy of the area without motion are respectively divided by a sum of the energy of the motion area and the energy of the area without motion.

The first standard value may be adjusted according to the noise level of the difference image based on the average value of the motion area.

The second function may have an initial value that is the second standard value of the previous difference image from among the difference image.

The method may further include determining that a sudden light change exists when a differential value in the respective area without motion of the previous difference image and the current image from among the difference image is above a predetermined threshold.

Thresholding may be performed by obtaining the second function to minimize the first function, wherein the first function is $E(\phi)$ and the second function is $\phi$, and when u is the difference image, $P^+(\phi, u)$ and $P^-(\phi, u)$ are the standard values respectively in the region where the second function $\phi$ is greater than 0 and less than 0, depending on the second function $\phi$ and the difference image u, $H(s)$ is a step function, wherein $H(s)=1$ when $s \geq 0$ and $H(s)=0$ when $s<0$, $\Phi$ is a predetermined function, and $\alpha$, $\lambda_1$, $\lambda_2$ and are variables in which the difference image is considered, $$E(\phi) = \int_\Omega \Phi(|\nabla \phi|) dx + \lambda_1 \int_\Omega \frac{H(\alpha + \phi)(u(x) - P^+(\phi, u))^2 \phi(x)}{\lambda_1(u(x) - P^+(\phi, u))^2 + \lambda_2(u(x) - P^-(\phi, u))^2} dx - \lambda_2 \int_\Omega \frac{H(\alpha - \phi)(u(x) - P^-(\phi, u))^2 \phi(x)}{\lambda_1(u(x) - P^+(\phi, u))^2 + \lambda_2(u(x) - P^-(\phi, u))^2} dx$$

The first function $E(\phi)$ may use a diffusional partial differential equation of $$\frac{\partial}{\partial t}\phi(x, t) = \nabla \cdot \left(\frac{\Phi'(|\nabla \phi|)}{|\nabla \phi|} \nabla \phi\right) - \lambda_1 \frac{(u(x) - P^+(\phi, u))^2 (H(\alpha + \phi) + \phi H'(\alpha + \phi))}{(u(x) - P^+(\phi, u))^2 + (u(x) - P^-(\phi, u))^2} + \lambda_2 \frac{(u(x) - P^-(\phi, u))^2 (H(\alpha - \phi) - \phi H'(\alpha - \phi))}{(u(x) - P^+(\phi, u))^2 + (u(x) - P^-(\phi, u))^2}$$

order to obtain the second function $\phi$ to minimize the first function $E(\phi)$.

The foregoing and/or other aspects and utilities of the general inventive concept may also be achieved by providing an apparatus to segment a motion area, the apparatus including an input unit to receive an image sequence, a background image generation unit to update a background image by using a previous input image from among the image sequence, a difference image generation unit to generate a difference image between a current image and the background image of the image sequence, a function generation unit to generate a second function to minimize a first function, the first function including regularized energy of the motion area of the difference image and regularized energy of an area without motion of the difference image, and a motion segmentation unit to segment the motion area based on the second function.

The foregoing and/or other aspects and utilities of the general inventive concept may also be achieved by providing a computer-readable recording medium having embodied thereon a computer program to execute a method, wherein the method includes updating a background image by using a previous input image from an input image sequence, generating a difference image between a current image of the image sequence and the background image, generating a second function to minimize a first function including regularized energy in a motion area of the difference image and regularized energy in an area without motion of the difference image and segmenting a motion area based on the second function.

The foregoing and/or other aspects and utilities of the general inventive concept may also be achieved by providing a method to segment a motion area using a surveillance camera system, the method including generating a difference image between a current image of an image sequence and a background image and generating a level set function to segment the motion area to detect motion by simultaneously performing noise removal and motion area segmentation.

The foregoing and/or other aspects and utilities of the general inventive concept may also be achieved by providing a motion segmentation apparatus, including a motion segmentation unit to generate a difference image between a current image of an image sequence and a background image and a function generation unit to generate a level set function to segment a motion area to detect motion by simultaneously performing noise removal and motion area segmentation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIGS. 1 through 6 illustrate configurations and methods according to embodiments of the present general inventive concept. Two adaptive modes of area segmentation technologies which can efficiently classify moving objects and noise even in a dark environment are suggested. The two adaptive modes of area segmentation technologies are based on a method of obtaining a solution of a regularized nonlinear partial differential equation which simultaneously combines a motion area segmentation and a noise removal. Consequently, an area segmentation algorithm is applied to various noise levels of input image sequence and can be operated in real-time without a special hardware accelerator.

Figure 1:
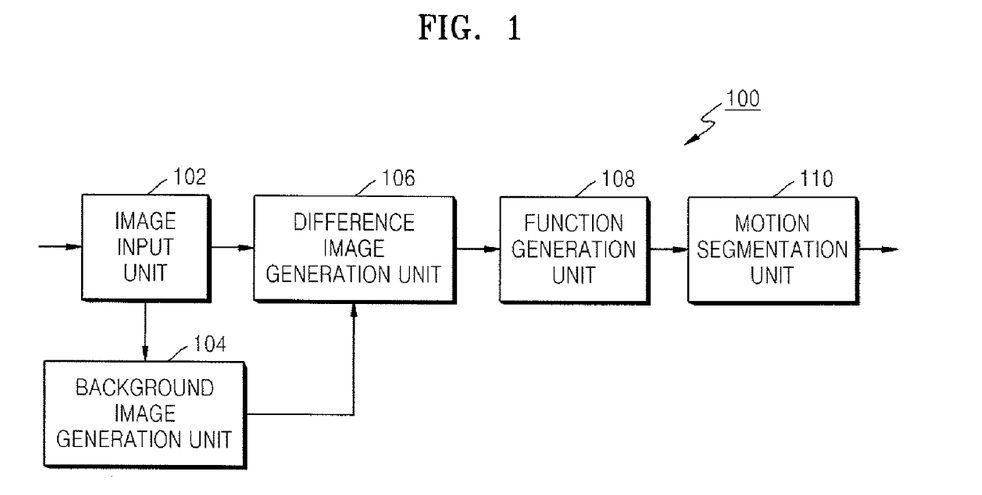
FIG. 1 is a functional block diagram illustrating an apparatus to segment a motion area in real-time to detect motion in a surveillance system, according to an embodiment of the present general inventive concept.

FIG. 1 is a functional block diagram illustrating an apparatus 100 to segment a motion area in real-time to detect motion in a surveillance camera system, according to an embodiment of the present general inventive concept.

Referring to FIG. 1, the apparatus 100 to segment a motion area according to an embodiment of the present general inventive concept includes an image input unit 102, a background image generation unit 104, a difference image generation unit 106, a function generation unit 108, and a motion segmentation unit 110.

The image input unit 102 receives an image in a position targeted to be monitored from the surveillance camera system and outputs the image to the background image generation unit 104 and the difference image generation unit 106. The surveillance camera system obtains the image in a position targeted to be monitored in a sequence form to analyze the image.

The background image generation unit 104 receives the current image from the image input unit 102 to generate a background image and outputs the background image to the difference image generation unit 106.

The background image corresponds to a portion of the image except for an area in which motion can be detected from a first image. That is, the portion of the image may be an area in which no motion is detected. When an object of the motion stops moving in a second image, the portion of the image of the first image may be a portion of the second image as the background image.

According to an embodiment of the present general inventive concept, a recurrent method generated by updating the current background image by using a previous image and a previous background image of a video stream input through the image input unit 102 is used. The background image is maintained recursively by using a simple adaptive filter.

Equation 1 below is the background image updated recursively by using the previous background image and the previous image.

$$B(x,t+1)=\gamma I(x,t)+(1-\gamma)B(x,t) \quad \text{[Equation 1]}$$

Here, γ is an updating variable between 0 and 1. In order to prevent an artificial tail phenomenon formed after a moving object, γ should be small. I(x, t) is an input image in the time t and B(x, t) is a background image. B(x, t+1) generated here is an updated background image and the background image generation unit 104 outputs the updated background image to the difference image generation unit 106.

The difference image generation unit 106 generates a current difference image by using the current input image input from the image input unit 102 and the current background image input from the background image generation unit 104 and outputs the current difference image to the function generation unit 108.

The current difference image may be obtained by subtracting the current background image generated by using the previous background image and the previous input image from the current input image.

Equation 2 is a current difference image obtained by subtracting the current background image from the current input image.

$$u(x,t)=I(x,t)-B(x,t) \quad \text{[Equation 2]}$$

In order to detect motion from an image, a motion area should be segmented so that a background image where no motion is detected is excluded from the current image so as to obtain an area in which motion of an object is detected. Accordingly, in the present general inventive concept, the difference image u(x, t) calculated by using Equation 2 is needed.

The function generation unit 108 generates a level set function, in order to minimize an energy function to detect motion, by using the current difference image input from the difference image generation unit 106 and outputs the level set function to the motion segmentation unit 110.

The motion segmentation unit 110 segments the motion area or the area where no motion is detected by using the level set function input from the function generation unit 108.

According to an embodiment of the present general inventive concept, the level set function generated from the function generation unit 108 minimizes the energy function developed to simultaneously segment the motion area through adaptive thresholding in the difference image and removes noise in order to segment the motion area more accurately. In addition, since noise removal and motion segmentation are not performed separately and are performed in one operation thus being efficient, noise is removed by iteration, and thresholding can be performed more accurately by noise level.

Figure 2:
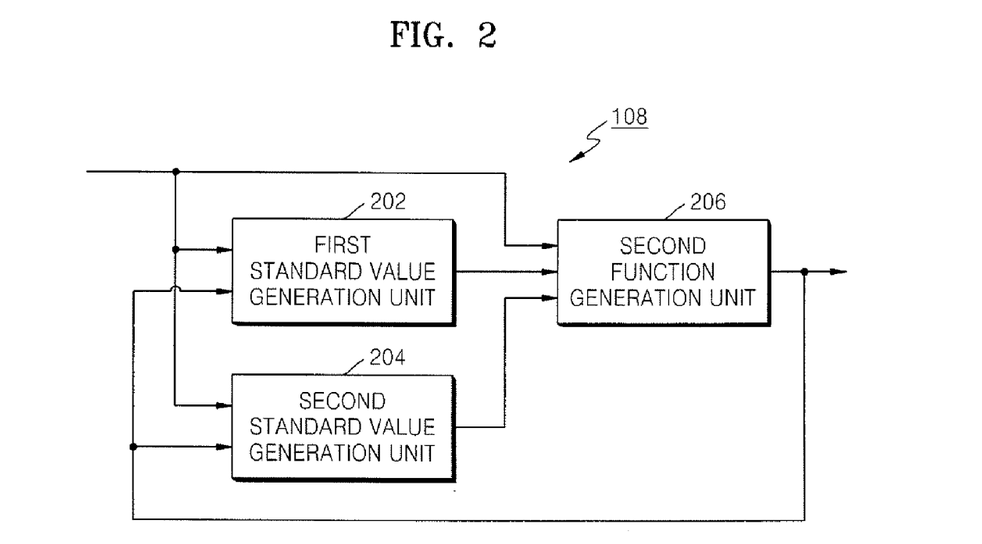
FIG. 2 is a functional block diagram illustrating a function generation unit of the apparatus of FIG. 1.

FIG. 2 is a functional block diagram illustrating the function generation unit 108 in more detail according to an embodiment of the present general inventive concept.

The function generation unit 108 includes a first standard value generation unit 202, a second standard value generation unit 204, and a second function generation unit 206.

The first standard value generation unit 202 generates a first standard value by using the current difference image input from the difference image generation unit 106 and outputs the first standard value to the second function generation unit 206.

The second standard value generation unit 204 generates a second standard value by using the current difference image input from the difference image generation unit 106 and outputs the second standard value to the second function generation unit 206.

The first and second standard values are important in segmenting the motion area adaptively from the difference image in two different forms. The first standard value is a variable representing the motion area and the second standard value is a variable representing the area in which no motion is detected, that is, the background image. This will be described more fully with reference to the energy function, the level set function, and FIGS. 3 through 6 below.

The second function generation unit 206 generates the level set function by using the difference image input from the difference image generation unit 106 and the standard value input from the first standard value generation unit 202 and the second standard value generation unit 204.

The second function generation unit 206 generates the level set function by using the difference image, the first standard value, and the second standard value and outputs the level set function to the motion segmentation unit 110. In the embodiment of the present general inventive concept, the energy function is used to segment the motion area of the difference image and an iteration process is needed to obtain the level set function which minimizes the energy function. In addition, the level set function is changed through such iteration and the first and second standard values which are dependent on the level set function and the difference image are changed at the same time so that the level set function is recurrently generated.

Hereinafter, the energy function and the level set function are described.

A level set method is a type of numerical analysis that traces contact points and boundary lines. An advantage of the level set method is to perform a numerical analytic operation including curves and surfaces on a fixed Cartesian grid without parameterizing the curves and the surfaces as in an Euler method. In addition, according to the level set method, for example, when outlines are divided into two, a hole is formed, or an opposite operation is performed, and the boundary lines, in which topology is changed, can be easily found.

On two dimensions, the level set method illustrates a closed curve $\Gamma$ on a plane as a zero level set of an auxiliary function $\phi$ of two dimensions and adjusts $\Gamma$ implicitly through the function $\phi$. Here, the function $\phi$ is referred to as the level set function. As in Equation 3 below, in an area where the level set function is 0, the curve $\Gamma$ is formed. It is assumed that the function $\phi$ has a positive value in a boundary area formed by the curve $\Gamma$ and has a negative value in an outside area of the boundary area.

$$\Gamma = \{(x,y) | \phi(x,y) = 0\} \quad \text{[Equation 3]}$$

FIGS. 3A through 3F illustrate images corresponding to a level set function.

Figure 3A:
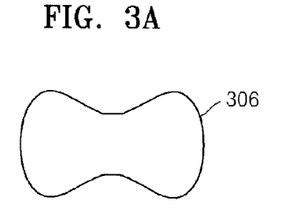
FIGS. 3A through 3F illustrate images corresponding to a level set function.
Figure 3B:
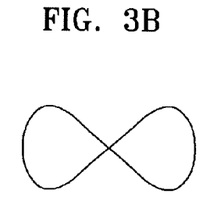
Figure 3C:
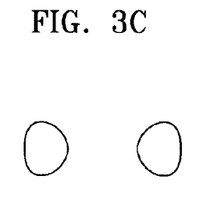
Figure 3D:
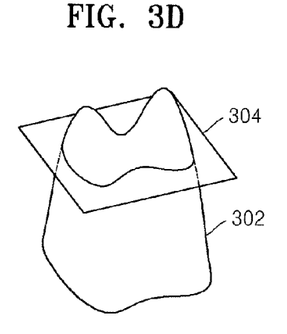
Figure 3E:
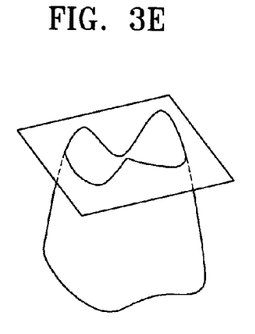
Figure 3F:
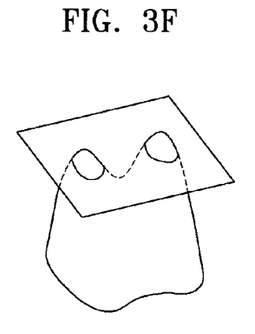

Areas 302 of FIGS. 3D, 3E, and 3F illustrate graphs of the level set function $\phi$ which determines outlines 306.

Planes 304 of FIGS. 3D, 3E, and 3F illustrate x-y planes.

The boundary lines of planes 306 in FIGS. 3A, 3B, and 3C are zero level sets of $\phi$ and the plane 306 itself includes a set of points on a plane in which $\phi$ is a positive value and 0.

In the planes 306 of FIGS. 3A, 3B, and 3C, it is illustrated that the area is divided into two and thus topology is changed. In FIGS. 3D, 3E, and 3F, the level set function simply moves downward in a parallel direction. Since the level set function moves downward in a parallel direction, the area 306 is also deformed. When all possible deformation of the area 306 needs to be observed, instead of directly adjusting the area 306, the level set function should be used to easily observe the deformation.

The level set function is applied to an image. Accordingly, the planes 304 of FIGS. 3D, 3E, and 3F correspond to the difference image u(x) and the planes 302 of FIGS. 3D, 3E, and 3F correspond to the level set function $\phi$. The planes 306 of FIGS. 3A, 3B, and 3C correspond to the motion area to be found. Therefore, the relationship between the level set function and the image can be analogized through FIGS. 3A through 3F. In the embodiments of the present general inventive concept, in order to identify outlines of the planes 306 that correspond to the motion area, the zero level set is obtained in which the level set function $\phi$ is 0.

Equation 4 below is an energy function proposed to distinguish the object from the background image having noise.

$$E(\phi) = \int_\Omega \Phi(|\nabla \phi|) dx + \quad \text{[Equation 4]}$$
$$\lambda_1 \int_\Omega \frac{H(\alpha + \phi)(u(x) - P^+(\phi, u))^2 \phi(x)}{\lambda_1 (u(x) - P^+(\phi, u))^2 + \lambda_2 (u(x) - P^-(\phi, u))^2} dx -$$
$$\lambda_2 \int_\Omega \frac{H(\alpha - \phi)(u(x) - P^-(\phi, u))^2 \phi(x)}{\lambda_1 (u(x) - P^+(\phi, u))^2 + \lambda_2 (u(x) - P^-(\phi, u))^2} dx$$

Here, u(x) is a difference image of the background image and the current image. In the difference image u(x), the motion area segmentation is accomplished by the level set function $\phi$ which minimizes the energy function of Equation 4. u=u(x, t) is the difference image between the input image I(x, t) in the time t and the updated background image B(x, t). $\alpha$ is a small positive value and $P^\pm(\phi, u)$ is a value which depends on $\phi$ and $\phi$ histogram of u(x). $\lambda_1$ and $\lambda_2$ are variables that are not negative values and $H(\phi)$ is a one dimensional step function, wherein $H(s)=1$ when $s \geq 0$ and $H(s)=0$ when $s<0$. $H(\pm\phi)$ moves in a parallel direction by $\mp\alpha(\alpha>0)$.

The first standard value and the second standard value designated for convenience of description respectively refer to $P^+(\phi, u)$ and $P^-(\phi, u)$.

When the level set function $\phi$ is obtained, the function $\phi$ is limited to a range of $-\alpha \leq \phi \leq \alpha$ when $\alpha>0$, in order to obtain the result of motion area segmentation rapidly.

The first term of the energy function $E(\phi)$ is the term to remove noise from the difference image. In generating the difference image between the input image and the background image, when noise exists in the image that is to be monitored, it may be identified that motion is generated since the location of noise is changed even if motion of the object to be monitored is not detected. The noise existence may be a factor that a false alarm of the surveillance system generates.

Therefore, for a more robust and efficient motion detection system, a background maintenance method, a method of separating a foreground and a background, and a morphological filter are needed. In a conventional motion detecting method, a small sized motion detected portion is removed from a binary image formed after detecting motion by using a morphological filter, in order to reduce a false alarm due to noise of the image.

However, in the present general inventive concept, since motion area segmentation and noise removal are simultaneously performed to detect motion, two conventional functions can be performed in one operation so as to improve efficiency.

The second term and the third term of Equation 4 are non-linear energy functions in which a coefficient of normalized distance between the difference image u(x,t) and the standard value is applied. In an embodiment of the present general inventive concept, energy corresponding to the motion area of the energy function and energy corresponding to the area in which no motion is detected is divided by the sum of the difference image and distances of each standard value, that is, $\lambda_1(u(x)-P^+(\phi, u))^2 + \lambda_2(u(x)-P^-(\phi, u))^2$ and is normalized.

Hereinafter, the definition and the function of the standard value $P^\pm(\phi, u)$ will be described with reference to FIG. 4.

The standard value $P^\pm(\phi, u)$ is normalized by using the distance between the difference image u(x) and the standard value $P^\pm(\phi, u)$ based on the average value of the difference image so as to be stabilized with changes of a surrounding environment and thus the number of false alarms can be reduced and the motion area can be segmented even in a dark environment or in an environment having noise.

Figure 4:
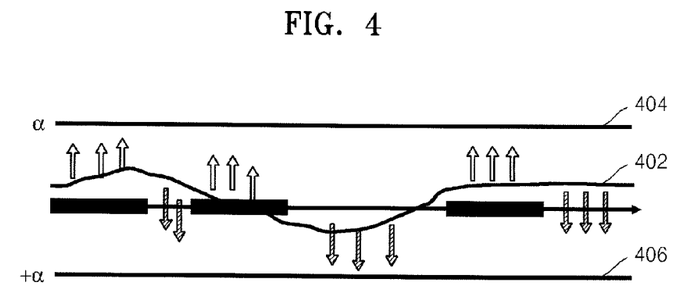
FIG. 4 illustrates a range of a level set function.

FIG. 4 illustrates a range of a level set function.

Referring to FIG. 4, a curve 402 indicates the level set function $\phi$ and a straight line 404 indicates a boundary line that is $\phi=\alpha$, and the straight line 406 indicates a boundary line that is $\phi=-\alpha$.

In Equation 4, when $\phi>\alpha$, $\phi$ converges to $\alpha$ in order to minimize Equation 4. Similarly, when $\phi<-\alpha$, $\phi$ converges to $-\alpha$ in order to minimize Equation 4. Accordingly, a competitive range of $-\alpha \leq \phi \leq \alpha$ is generated.

Thus, in obtaining the level set function $\phi$ which minimizes the energy function $E(\phi)$, $\phi$ converges to $\phi=\alpha$ in the area $\lambda_1|u-P^+|^2 < \lambda_2|u-P^-|^2$ and $\phi$ converges to $\phi=-\alpha$ in the area $\lambda_1|u-P^+|^2 < \lambda_2|u-P^-|^2$.

More adaptive result to the image can be drawn through the competition due to changes of two standard values by using two terms so that the method of the present general inventive concept can be a bimodal segmentation method.

The standard value $P^\pm(\phi, u)$ is related to an iteration performed in the embodiment of the present general inventive concept. The iteration is used to obtain the level set function $\phi$ which minimizes the energy function $E(\phi)$. $\phi$ updated by iteration, $P^+(\phi, u)$, and $P^-(\phi, u)$ are changed so as to minimize the energy function and the motion area of the image can be adaptively segmented.

In general, the more the iteration is performed, the more accurate of a result can be obtained; however, limitless iteration is impossible in a surveillance camera system in which real-time processing is important. Here, since the object of the operation is to converge the level set function $\phi$ to $\phi=\alpha$ or $\phi=-\alpha$, the frequency of the iteration is affected by the $\alpha$.

Equation 5 below is an Euler-Lagrange equation of Equation 4 to obtain the minimum value of Equation 4. Accordingly, in order to obtain the level set function $\phi$ to minimize the energy function of Equation 4, Equation 5, which is a partial differential equation, should be used.

$$\frac{\partial}{\partial t}\phi(x, t) = \nabla \cdot \left(\frac{\Phi'(|\nabla \phi|)}{|\nabla \phi|}\nabla \phi\right) - \quad \text{[Equation 5]}$$

$$\lambda_1 \frac{(u(x) - P^+(\phi, u))^2(H(\alpha + \phi) + \phi H'(\alpha + \phi))}{(u(x) - P^+(\phi, u))^2 + (u(x) - P^-(\phi, u))^2} +$$

$$\lambda_2 \frac{(u(x) - P^-(\phi, u))^2(H(\alpha - \phi) - \phi H'(\alpha - \phi))}{(u(x) - P^+(\phi, u))^2 + (u(x) - P^-(\phi, u))^2}$$

In an embodiment of the present general inventive concept, in order to reduce a calculation amount of Equation 5, $\Phi(a)$ is $0.5a^2$ and Equation 6 is a simplified equation of Equation 5.

$$\frac{\partial \phi}{\partial t} = \nabla^2 \phi + \frac{-\lambda_1(u(x) - P^+(\phi, u))^2 + \lambda_2(u(x) - P^-(\phi, u))^2}{\lambda_1(u(x) - P^+(\phi, u))^2 + \lambda_2(u(x) - P^-(\phi, u))^2} \quad \text{[Equation 6]}$$

In order to realize such equation in real-time, a fast scheme is used and is illustrated in Equation 7 below.

$$\phi_{i,j}^{n+1} = \phi_{i,j}^n + \frac{1}{4}\{\phi_{i-1,j}^n + \phi_{i+1,j}^n + \phi_{i,j-1}^n + \phi_{i,j+1}^n - 4\phi_{i,j}^n\} + \quad \text{[Equation 7]}$$

$$\frac{-\lambda_1|u - P^+(\phi^n, u)|^2 + \lambda_2|u - P^-(\phi^n, u)|^2}{\lambda_1|u - P^+(\phi^n, u)|^2 + \lambda_2|u - P^-(\phi^n, u)|^2}$$

In Equation 7, n indicates the number of iteration and 1 and j indicate locations of the image. In an embodiment of the present general inventive concept, iteration is performed by using Equation 7 and the level set function $\phi$ in $n+1^{th}$ iteration is obtained by using the level set function $\phi$ in $n^{th}$ iteration, a difference image u, and the standard values of $P^+(\phi, u)$ and $P^-(\phi, u)$ in $n^{th}$ iteration. Thus, a recurrent iteration is accomplished.

In addition, since a partial differential equation in Equation 7, that is, a differential value between adjacent pixels of the corresponding pixel, is used, iteration considering the noise area is possible. Accordingly, while the motion area is segmented, a noise area and a motion area can be segmented.

According to an embodiment of the present general inventive concept, during iteration, the initial value of the level set function $\phi$, that is, $\phi$ when n=0, is defined as $P^-(\phi, u)$ of a previous image.

As in an embodiment of the present general inventive concept, when a fast scheme is used as in Equation 7, the motion area segmentation method can be used in a surveillance system environment in which real-time operation is important and the method without the fast scheme could not be used previously despite its excellent performance. Thus, even though iteration to segment the area is performed, the area corresponding to the motion area is segmented in real-time so as to detect motion.

As illustrated above, in the present general inventive concept, an area in which the level set function is greater than 0 is determined as a motion area and an area in which the level set function is less than 0 is determined as an area with no motion. Accordingly, the area in which the level set function is greater than 0 is counted so as to detect the motion area. Therefore, in the motion segmentation unit 110, when the second function value of the corresponding pixel is greater than 0, the corresponding pixel is determined as the pixel of the motion area, when the second function value of the corresponding pixel is less than 0, the corresponding pixel is determined as the pixel of the area with no motion, and when the second function value of the corresponding pixel is 0, the pixel is determined as the pixel on the boundary of the motion area.

In order to identify the portion having moving objects in the current image, the number of the pixels that is determined as the motion area in the difference image is counted. When the level set function for the pixel of the difference image of the current image is greater than a threshold in which a pixel having a value greater than 0 is determined as an empirical value, the motion area exists in the current image so that it is determined that the moving objects exist. Thus, when the number of the pixels in which the level set function is greater than 0 is greater than a predetermined threshold, motion is detected from the current image.

Hereinafter, adjusting $P^\pm(\phi, u)$ is described with reference to FIGS. 5 and 6.

In order to minimize the energy function $E(\phi)$, the non-linear function $P^+(\phi, u)$ draws an image of the moving objects automatically. Alternatively, $P^-(\phi, u)$ considers a global structure of the difference image so that the background image having noise is drawn. Accordingly, the energy function of Equation 4, wherein Equation 4 is related to the level set function $\phi$, adjusts the extent of normalization related to $P^+(\phi, u)$ and $P^-(\phi, u)$, and its regularity( ).

The standard value according to the range of the level set function $\phi$ depends on the level set function $\phi$ and the difference image. Simply, $P^+(\phi, u)$ is the average value of the pixel in the area in which the level set function $\phi$ is greater than 0 and $P^-(\phi, u)$ is the average value of the pixel in the area where the level set function $\phi$ is less than 0. That is, when the average value $c^-(\phi)$ of the pixel in the area where $c^+(\phi)$ is $\phi>0$ indicates the average value of the pixel in the area where $\phi<0$, $P^+(\phi, u)=c^+(\phi)$ and $P^-(\phi, u)=c^-(\phi)$.

In an embodiment of the present general inventive concept, since the area in which the level set function $\phi$ is greater than 0 is determined as the motion area and the area in which the level set function $\phi$ is less than 0 is determined as the area with no motion, that is, a background, $P^+(\phi, u)$ is related to motion and $P^-(\phi, u)$ is related to the background and noise.

Figure 5:
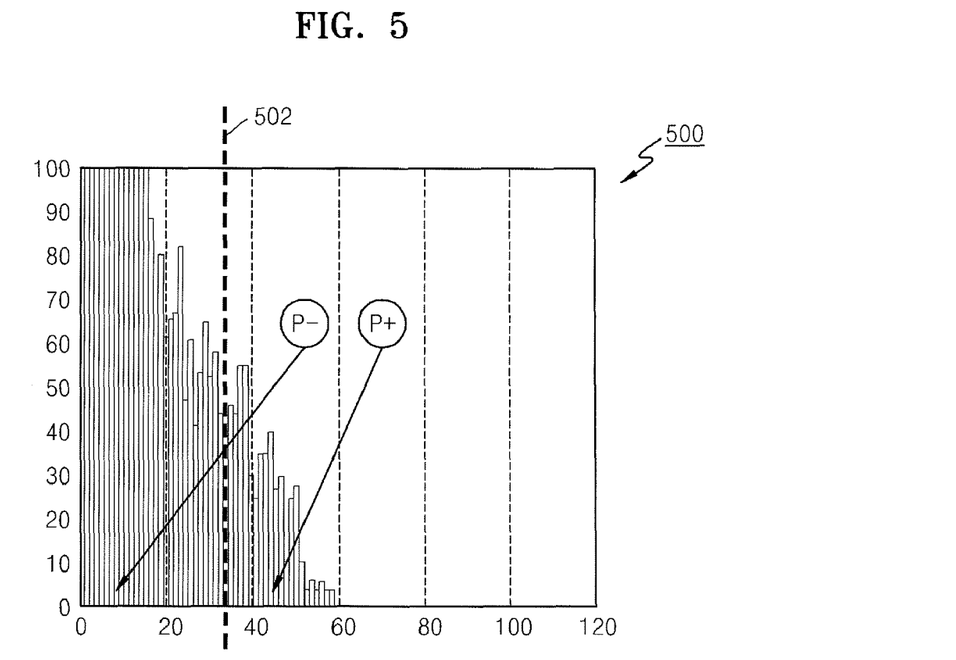
FIG. 5 is a graph illustrating a standard value of an area segmented according to a level set function.

FIG. 5 is a graph 500 illustrating a standard value of an area segmented according to a level set function.

Referring to FIG. 5, the graph 500 illustrates a histogram of the difference image. The horizontal axis of the graph 500 indicates the pixel value and the vertical axis indicates the frequency.

A vertical dotted straight line 502 indicates a boundary line which divides the level set function $\phi$ into two. The boundary line is determined by $P^-$ and the proportions $\sqrt{\lambda_1}$ and $\sqrt{\lambda_2}$ of the distance from $P^+$. Therefore, if $\lambda_1=\lambda_2$, the boundary line is $$\frac{P^- + P^+}{2}.$$

In the area to the right of the vertical dotted straight line 502, $P^+(\phi, u)$ representing the area where the level set function $\phi$ is greater than 0 is determined and in the area to the left of the vertical dotted straight line 502, $P^-(\phi, u)$ representing the area in which the level set function $\phi$ is less than 0 is determined. Accordingly, $P^+(\phi, u)$ is an average value of the area to the right of the vertical dotted straight line 502 and $P^-(\phi, u)$ is an average value of the area to the left of the vertical dotted straight line 502.

In an embodiment of the present general inventive concept, the images of $P^+(\phi, u)$ and $P^-(\phi, u)$ are deformed according to the noise level in order to segment the motion area adaptive to the image. In particular, in the image only having noise, the level set function $\phi$ can hardly segment the area and thus the average values of each area $c^+(\phi)$ and $c^-(\phi)$ are almost similar. Accordingly, if the standard value is simply determined as the average value of the pixel, accurate area segmentation cannot be accomplished.

Therefore, in an environment only with noise, $P^+(\phi, u)$ is adjusted so that area segmentation adaptive to the image can be accomplished. That is, instead of $P^+(\phi, u)=c^+(\phi)$, $P^+(\phi, u)=c^+(\phi)+\epsilon_1(u)$ is used. Here, $\epsilon_1(u)$ is an empirical value according to the difference image u. Since $\epsilon_1(u)$ is adjusted in the environment only with noise so as to increase $P^+(\phi, u)$, more accurate motion area segmentation can be drawn.

Figure 6A:
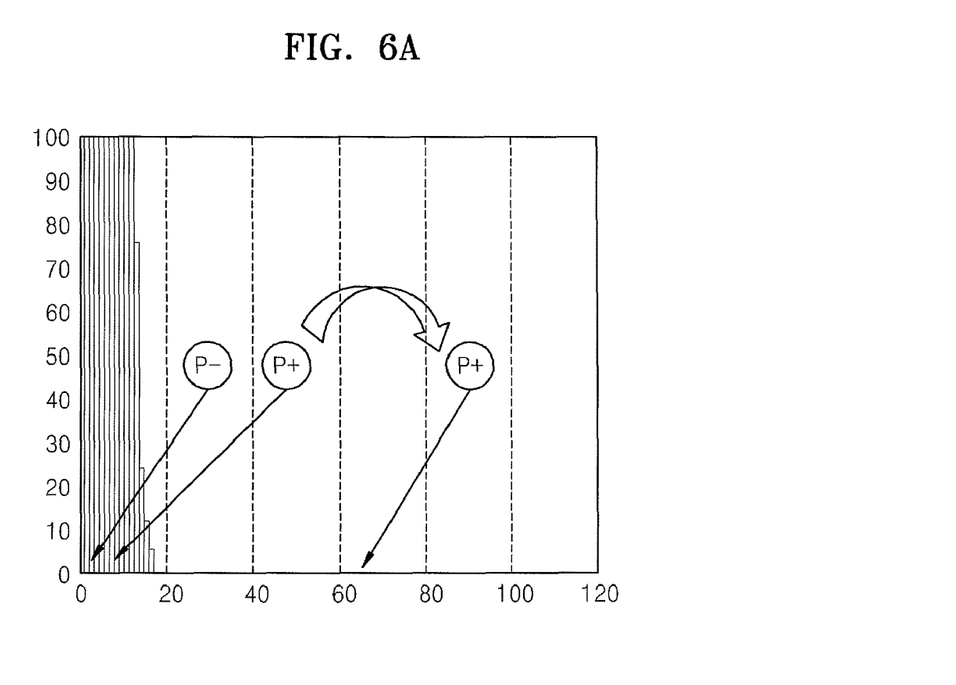
FIGS. 6A and 6B are graphs illustrating a method of adjusting a standard value in a motion area according to a noise level, according to an embodiment of the present general inventive concept.
Figure 6B:
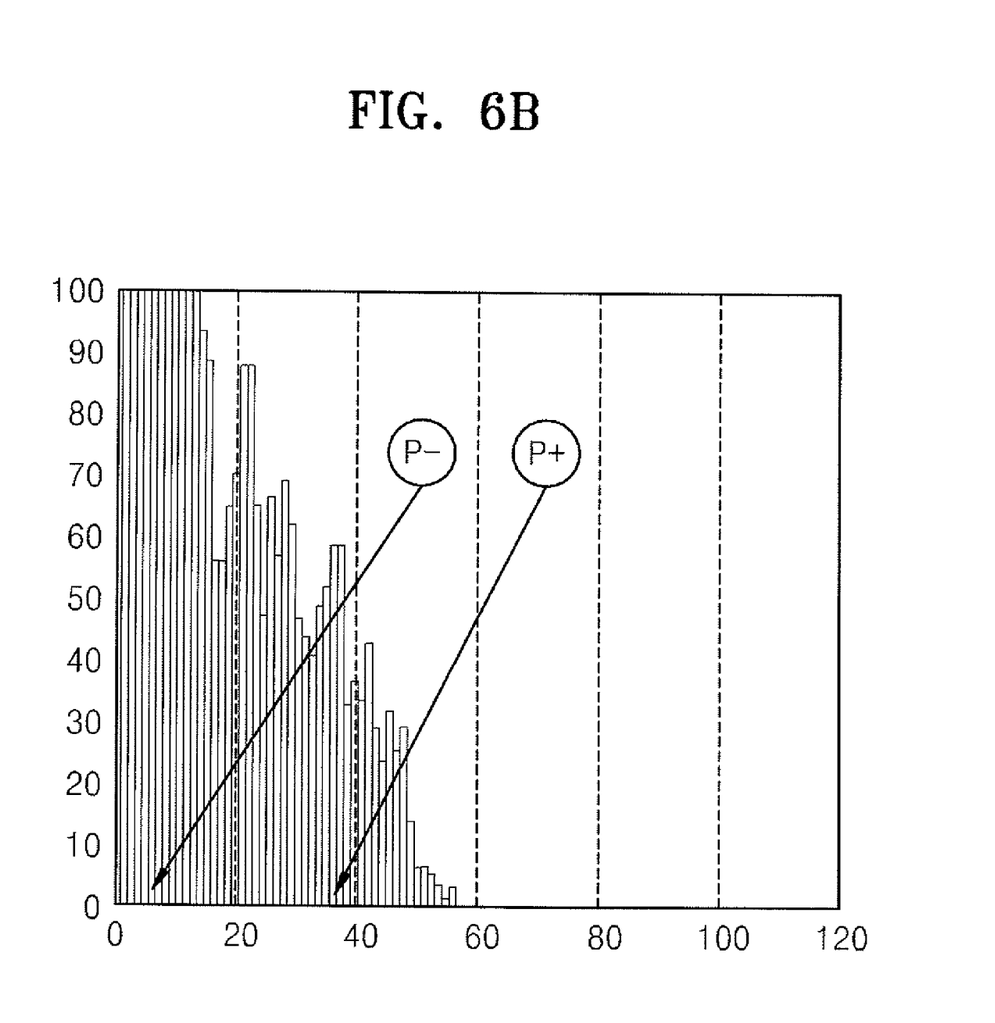

FIGS. 6A and 6B are graphs illustrating a method of adjusting a standard value in a motion area according to a noise level, according to an embodiment of the present general inventive concept.

FIG. 6A illustrates a histogram of an image only having noise in a low illumination environment and FIG. 6B illustrates a histogram of an image having moving objects. Unlike the histogram in FIG. 6B, the histogram in FIG. 6A is of an image only having noise in a very low illumination environment and thus is concentrated on the left side so that two standard values are almost similar and area segmentation becomes difficult. Accordingly, as in $P^+(\phi, u)=c^+(\phi)+\epsilon_1(u)$, $P^+(\phi, u)$ moves right in a parallel direction, that is, increases, according to the noise level of a surveillance environment and thus is adjusted. Thus, bimodal area segmentation is also possible.

As illustrated above, the initial value of the level set function $\phi$ for iteration is set according to $P^-(\phi, u)$. Since the motion area is detected by iteration, the initial value is set according to the standard value that depends on the background image. Here, the initial value of the level set function $\phi$ can be defined with the result thresholding the difference image u with the threshold level $c^-(\phi)+\epsilon_2(u)$ of the previous image. Here, $\epsilon_2(u)$ is an empirical value according to the difference image u.

In an embodiment of the present general inventive concept, the motion area is segmented by considering sudden light changes. In a conventional motion area segmentation method, when the difference value is generated in an entire image, such as the light change, it can be determined that the entire difference image is the motion area. In the present general inventive concept, the fact that the difference value is greatly generated is considered due to light changes in the background where no motion is detected. Accordingly, the variable $P^-(\phi, u)$ representing the background area without motion is adjusted and light changes is reflected. That is, when the difference value of $P^-(\phi, u)$ between the previous frame and the current frame is above a predetermined value, it is determined that the difference occurs in the entire background so as to confirm as the light changes. Therefore, motion area segmentation that is suitable for the light changes is possible.

Figure 7:
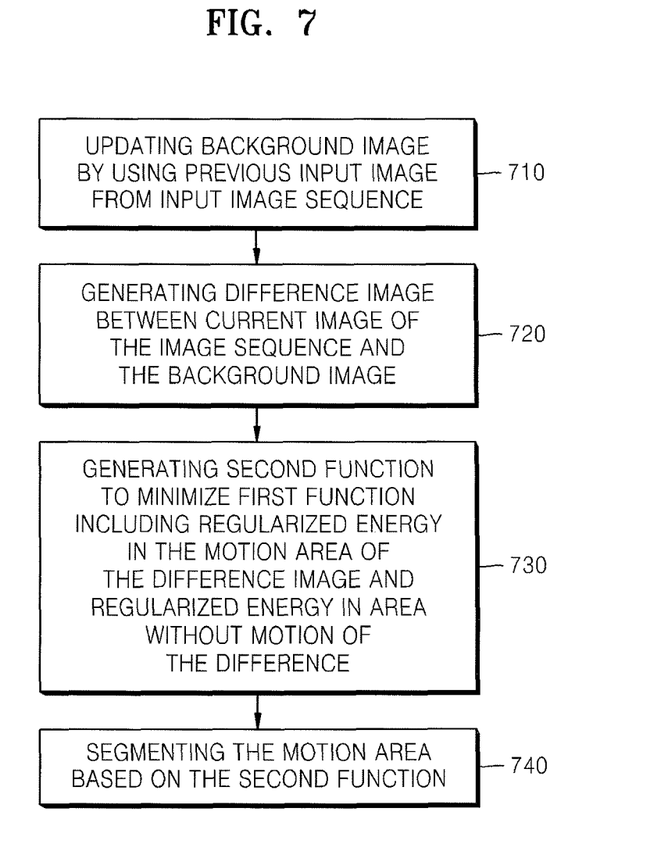
FIG. 7 is a flowchart illustrating a method of segmenting a motion area according to an embodiment of the present general inventive concept.

FIG. 7 is a flowchart illustrating a method of segmenting a motion area according to an embodiment of the present general inventive concept. Referring to FIG. 7, in operation 710, a background image by using a previous input image from an input image sequence is updated. In operation 720, a difference image between a current image of the image sequence and the background image is generated. In operation 730, a second function to minimize a first function including regularized energy in the motion area of the difference image and regularized energy in an area without motion of the difference image is generated. In operation 740, the motion area based on the second function is segmented.

Figure 8:
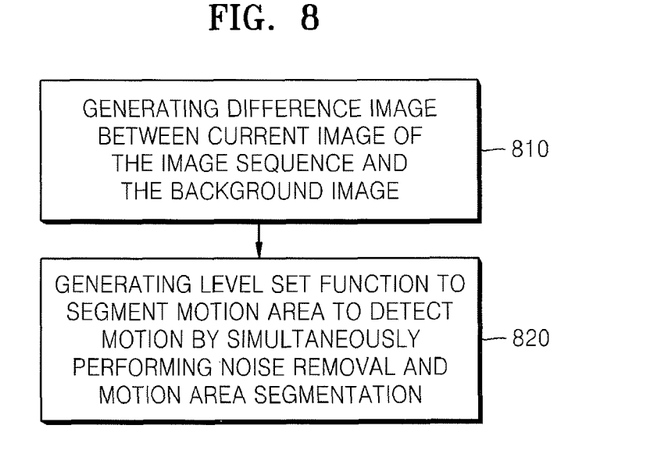
FIG. 8 is a flowchart illustrating a method to segment a motion area using a surveillance camera system according to an embodiment of the present general inventive concept.

FIG. 8 is a flowchart illustrating a method to segment a motion area using a surveillance camera system according to an embodiment of the present general inventive concept. Referring to FIG. 8, in operation 810, a difference image between a current image of an image sequence and a background image is generated. In operation 820, a level set function to segment the motion area to detect motion by simultaneously performing noise removal and motion area segmentation is generated.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

In the method and apparatus to segment a motion area to detect motion in a surveillance camera system according to various embodiments of the present general inventive concept, motion area segmentation and noise removal are performed simultaneously in real time in order to accurately detect motion even in a low illumination environment.

The adaptive bimodal segmentation is based on the method of obtaining a solution of a regularized nonlinear partial differential equation which simultaneously combines motion area segmentation and noise removal. An area segmentation algorithm is applied to various noise levels of input image sequences so that more accurate motion can be detected in a low illumination environment with a lot of noise. In addition, motion area segmentation and noise removal are simultaneously performed so that the method and apparatus of the present general inventive concept are efficient and are adaptive to the image. Moreover, regularization of the energy function reduces possibilities of generating a false alarm and stably detects motion.

Even though, the motion area segmentation method by iteration is used, real-time operation is possible without a special hardware accelerator. Also, since the light change which affects the entire image can be considered, the motion area can be accurately segmented even if there is sudden light change. Furthermore, based on the area segmentation algorithm of the present general inventive concept, an artificially intelligent surveillance algorithm such as object tracking, object identification, or object classification can be developed.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of segmenting a motion area from a current image, the method comprising:
   obtaining a background image of the current image by using a previous image of the current image;
   obtaining a difference image between the current image and the background image;
   obtaining a level set function of the current image to minimize an energy function of the current image comprising a regularized energy of the motion area of the difference image and a regularized energy of a non-motion area of the difference image; and
   segmenting the motion area from the current image based on the level set function,
   wherein the regularized energy of the motion area is obtained by using a difference between a first standard value generated by using the difference image, corresponding to an average pixel value of the motion area, and the difference image, and the regularized energy of the non-motion area is obtained by using a difference between a second standard value generated by using the difference image, corresponding to an average pixel value of the non-motion area, and the difference image, and
   wherein the obtaining the level set function comprises iteratively calculating the level set function n+1 times, where n is an integer equal to or greater than 1, and the level set function obtained at a k-th calculation is calculated based on a level set function obtained at a (k−1)-th calculation, the difference image, the first and second standard values used to obtain the level set function obtained at the (k−1)-th calculation, where k is an integer equal to or greater than 2 and equal to or less than n+1, and
   wherein, by the iteratively calculating, the level set function of the current image and the first and second standard values of the current image change at each time of the iterative calculating.

2. The method of claim 1, wherein the obtaining a background image comprises adding a result obtained by multiplying the previous image by a first weight to a result obtained by multiplying a background image of the previous image by a second weight, wherein a sum of the first weight and the second weight is 1.

3. The method of claim 1, wherein the segmenting the motion area from the current image comprises:
   determining a pixel of the difference image in which the level set function is greater than 0 as a pixel of the motion area;
   determining a pixel of the difference image in which the level set function is less than 0 as a pixel of the non-motion area;
   determining a pixel of the difference image in which the level set function is 0 as a pixel of a boundary of the motion area; and
   when a number of pixels in which the level set function is greater than 0 is above a predetermined threshold, determining that motion is detected in the current image.

4. The method of claim 1, wherein the energy function comprises noise energy using a function related to a partial differential value of the level set function.

5. The method of claim 1, wherein
   the integer n is determined based on a set value to which the level set function converges.

6. The method of claim 1, wherein the level set function obtained by the iterative calculating is a real time value with respect to the current image.

7. The method of claim 1, wherein each of the regularized energies of the motion area and the non-motion area is regularized by being divided by a sum of the difference between the difference image and the first standard value, and the difference between the difference image and the second standard value, respectively.

8. The method of claim 1, further comprising:
   determining a noise level in the current image, and
   adjusting the first standard value by a weight according to the determining.

9. The method of claim 1, wherein an initial value of the level set function of the current image for the iterative calculating is set to the second standard value of the previous image.

10. The method of claim 1, wherein the segmenting the motion area from the current image comprises determining that a sudden light change exists if a difference between the second standard value and a second standard value corresponding to an average pixel value of a non-motion area of the previous image is above a predetermined threshold.

11. The method of claim 1, wherein the energy function is represented by an equation of:

$$E(\phi) = \int_\Omega \Phi(|\nabla \phi|)dx + \lambda_1 \int_\Omega \frac{H(\alpha + \phi)(u(x) - P^+(\phi, u))^2 \phi(x)}{\lambda_1(u(x) - P^+(\phi, u))^2 + \lambda_2(u(x) - P^-(\phi, u))^2} dx - \lambda_2 \int_\Omega \frac{H(\alpha - \phi)(u(x) - P^-(\phi, u))^2 \phi(x)}{\lambda_1(u(x) - P^+(\phi, u))^2 + \lambda_2(u(x) - P^-(\phi, u))^2} dx,$$

where $E(\phi)$ is the energy function, $\phi$ is the level set function, u is the difference image, $P^+(\phi, u)$ and $P^-(\phi, u)$ are the first and second standard values respectively in areas of the current image where the level set function $\phi$ is greater than 0 and less than 0, respectively, depending on the level set function $\phi$ and the difference image u, H(s) a step function, wherein H(s)=1 when s≧0 and H(s)=0 when s<0, $\Phi$ is a predetermined function, and $\alpha, \lambda_1$, and $\lambda_2$ are variables in which the difference image is considered, $$E(\phi) = \int_\Omega \Phi(|\nabla \phi|)dx - \lambda_2 \int_\Omega \frac{H(\alpha - \phi)(u(x) - P^-(\phi, u))^2 \phi(x)}{\lambda_1(u(x) - P^+(\phi, u))^2 + \lambda_2(u(x) - P^-(\phi, u))^2} dx.$$

12. The method of claim 11, wherein the level set function φ is obtained by calculating equation of:

$$\frac{\partial}{\partial t}\phi(x,t) = \nabla \cdot \left(\frac{\Phi'(|\nabla \phi|)}{|\nabla \phi|}\nabla \phi\right) + \lambda_2 \frac{(u(x) - P^-(\phi, u))^2(H(\alpha - \phi) - \phi H'(\alpha - \phi))}{(u(x) - P^+(\phi, u))^2 + (u(x) - P^-(\phi, u))^2}$$

$$\phi_{i,j}^{n+1} = \phi_{i,j}^n + \frac{1}{4}\{\phi_{i-1,j}^n + \phi_{i+1,j}^n + \phi_{i,j-1}^n + \phi_{i,j+1}^n - 4\phi_{i,j}^n\} +$$

$$\frac{-\lambda_1 |u - P^+(\phi^n, u)|^2 + \lambda_2 |u - P^-(\phi^n, u)|^2}{\lambda_1 |u - P^+(\phi^n, u)|^2 + \lambda_2 |u - P^-(\phi^n, u)|^2},$$

where $\phi_{i,j}^{n+1}$ is a level set function obtained at an (n+1)th calculation based on a level set function $\phi_{i,j}^n$ obtained at an n-th calculation, and i and j indicate a coordinate of a pixel in the current image.

13. An apparatus to segment a motion area from a current image, the apparatus comprising:
an input device which receives the current image;
a background image generation device which obtains a background image of the current image by using a previous image of the current image;
a difference image generation device which obtains a difference image between the current image and the background image;
a function generation device which obtains a level set function of the current image to minimize an energy function of the current image, the energy function comprising a regularized energy of the motion area of the difference image and a regularized energy of a non-motion area of the difference image; and
a motion segmentation device which segments the motion area from the current image based on the level set function,
wherein the function generation device obtains the regularized energy of the motion area by using a difference between a first standard value generated by using the difference image, corresponding to an average pixel value of the motion area, and the difference image, and obtains the regularized energy of the non-motion area by using a difference between a second standard value generated by using the difference image, corresponding to an average pixel value of the non-motion area, and the difference image, and
wherein the function generation device obtains the level set function by iteratively calculating the level set function n+1 times, where n is an integer equal to or greater than 1, and the level set function obtained at a k-th calculation is calculated based on a level set function obtained at a (k−1)-th calculation, the difference image, the first and second standard values used to obtain the level set function obtained at the (k−1)-th calculation, where k is an integer equal to or greater than 2 and equal to or less than n+1, and
wherein, by the iteratively calculating, the level set function of the current image and the first and second standard values of the current image change at each time of the iterative calculating.

14. The apparatus of claim 13, wherein
the integer n is determined based on a set value to which the level set function converges,
wherein the level set function obtained by the iterative calculating is a real time value with respect to the current image, and
wherein the function generation device determines a noise level in the current image, and adjusts the first standard value by a weight according to the noise level.

15. The apparatus of claim 13, wherein, in the background image generation device, a result obtained by multiplying the previous image by a first weight is added to a result obtained by multiplying a background image of the previous image by a second weight, wherein a sum of the first weight and the second weight is 1.

16. The apparatus of claim 13, wherein the motion segmentation device
determines a pixel of the difference image in which the level set function is greater than 0 as a pixel of the motion area, a pixel of the difference image in which the level set function is less than 0 as a pixel of the non-motion area, and a pixel of the difference image in which the level set function is 0 as a pixel of a boundary of the motion area,
wherein, the motion segmentation device further determines that motion is detected in the current image, when a number of pixels in which the level set function value is greater than 0 is above a predetermined threshold.

17. The apparatus of claim 13, wherein
an initial value of the level set function of the current image for the iterative calculating is set to the second standard value of the previous image.

18. The apparatus of claim 13, wherein the motion segmentation device determines that a sudden light change exists if a difference between the second standard value and a second standard value corresponding to an average pixel value of a non-motion area of the previous image is above a predetermined threshold.

19. The apparatus of claim 13, wherein the energy function is represented by an equation of:

$$E(\phi) = \int_\Omega \Phi(|\nabla \phi|)dx + \lambda_1 \int_\Omega \frac{H(\alpha + \phi)(u(x) - P^+(\phi, u))^2 \phi(x)}{\lambda_1(u(x) - P^+(\phi, u))^2 + \lambda_2(u(x) - P^-(\phi, u))^2}dx -$$

$$\lambda_2 \int_\Omega \frac{H(\alpha - \phi)(u(x) - P^-(\phi, u))^2 \phi(x)}{\lambda_1(u(x) - P^+(\phi, u))^2 + \lambda_2(u(x) - P^-(\phi, u))^2}dx,$$

where E(φ) is the energy function, φ is the level set function, u is the difference image, $P^+(\phi, u)$ and $P^-(\phi, u)$ are the first and second standard values respectively in areas of the current image where the level set function φ is greater than 0 and less than 0, respectively, depending on the level set function φ and the difference image u, H(s) is a step function, wherein H(s)=1 when s≧0 and H(s)=0 when s<0, Φ is a predetermined function, and α, $\lambda_1$, and $\lambda_2$ are variables in which the difference image is considered, $$E(\phi) = \int_\Omega \Phi(|\nabla \phi|)dx - \lambda_2 \int_\Omega \frac{H(\alpha - \phi)(u(x) - P^-(\phi, u))^2 \phi(x)}{\lambda_1(u(x) - P^+(\phi, u))^2 + \lambda_2(u(x) - P^-(\phi, u))^2}dx.$$

20. The method of claim 13, wherein each of the regularized energies of the motion area and the non-motion area is regularized by being divided by a sum of the difference between the difference image and the first standard value, and the difference between the difference image and the second standard value, respectively.

21. A computer readable recording medium having embodied thereon a computer program to execute a method, the method comprising:

obtaining a background image of the current image by using a previous image of the current image;

obtaining a difference image between the current image and the background image;

obtaining a level set function of the current image to minimize an energy function of the current image comprising a regularized energy of the motion area of the difference image and a regularized energy of a non-motion area of the difference image; and     segmenting the motion area from the current image based on the level set function,     wherein the regularized energy of the motion area is obtained by using a difference between a first standard value generated by using the difference image, corresponding to an average pixel value of the motion area, and the difference image, and the regularized energy of the non-motion area is obtained by using a difference between a second standard value generated by using the difference image, corresponding to an average pixel value of the non-motion area, and the difference image, and     wherein the obtaining the level set function comprises iteratively calculating the level set function n+1 times, where n is an integer equal to or greater than 1, and the level set function obtained at a k-th calculation is calculated based on a level set function obtained at a (k−1)-th calculation, the difference image, the first and second standard values used to obtain the level set function obtained at the (k−1)-th calculation, where k is an integer equal to or greater than 2 and equal to or less than n+1, and     wherein, by the iteratively calculating, the level set function of the current image and the first and second standard values of the current image change at each time of the iterative calculating.

* * * * *